JOHN ALFRED LIPSCOMBE, Inventor

By Wenderoth, Lind & Ponack
Attorneys

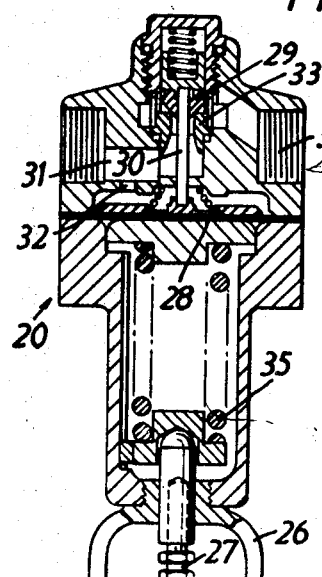
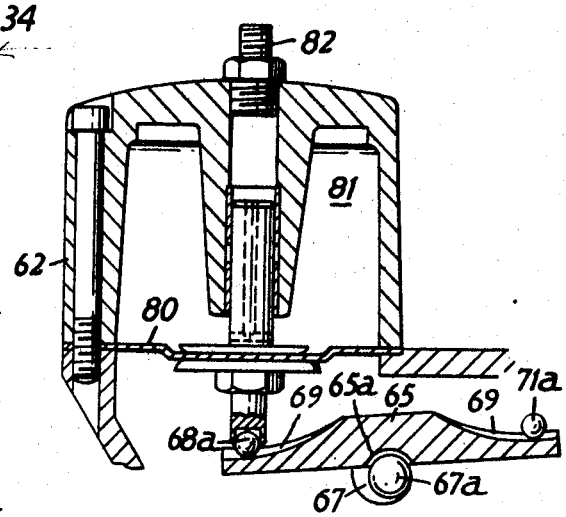
FIG. 4.
FIG. 7.

United States Patent Office 3,562,784
Patented Feb. 9, 1971

3,562,784
CONTROL VALVE ARRANGEMENTS
John Alfred Lipscombe, Ashford, England, assignor to Walton Engineering Company Limited, London, England, a British company
Filed Jan. 16, 1969, Ser. No. 791,698
Claims priority, application Great Britain, Jan. 18, 1968, 2,874/68
Int. Cl. F01d 7/16
U.S. Cl. 236—34.5    11 Claims

ABSTRACT OF THE DISCLOSURE

A temperature responsive control valve arrangement for controlling the temperature of a liquid flowing in a conduit comprises an element responsive to the temperature of the liquid in the conduit, a heat exchanger through which at least part of the flow of liquid and at least part of a flow of a secondary fluid flow in heat exchange relationship, a by-pass valve controlling the flow of either the liquid or the secondary fluid through the heat exchanger for regulating the proportions in which the liquid and the secondary fluid flow through the heat exchanger, by dividing the flow therethrough between the heat exchanger and a by-pass passage, the valve being adapted so that the total flow area provided thereby for the flows through the heat exchanger and the by-pass passage is constant for all positions of the valve, and a single-acting piston type servo motor connected to the valve and operated by a servo fluid against the restraint of a spring operating on the piston the pressure of which servo fluid is controlled in dependence on the temperature responsive element in a sense to maintain the temperature of said liquid constant.

---

This invention relates to temperature responsive control valve arrangements and has particularly useful but not exclusive applications in controlling the temperature of the cooling water and lubricating oil for large diesel engines, such as marine diesel engines.

According to this invention there is provided a temperature responsive control valve arrangement for controlling the temperature of a liquid flowing in a conduit, comprising an element responsive to the temperature of the liquid in the conduit, a heat exchanger through which at least part of the flow of liquid and at least part of a flow of a secondary fluid flow in heat exchange relationship, a by-pass valve controlling the flow of either the liquid or the secondary fluid through the heat exchanger for regulating the proportions in which the liquid and the secondary fluid flow through the heat exchanger by dividing the flow therethrough between the heat exchanger and a by-pass passage, the valve being adapted so that the total flow area provided thereby for the flows through the heat exchanger and the by-pass pasage is constant for all positions of the valve, and a single-acting piston type servo motor connected to the valve and operated by a servo fluid against the restraint of a spring operating on the piston, the pressure of which servo fluid is controlled in dependence on the temperature responsive element in a sense to maintain the temperature of said liquid constant.

According to a preferred feature of the invention, the secondary fluid is a coolant and the temperature responsive element controls the pressure of the servo fluid applied to the piston of the servo motor to be at a maximum when the flow through the heat exchanger determined by the valve is a minimum.

Preferably the movement of the plunger is transmitted to a servo valve by a lever, the plunger and the servo valve being connected to the lever at opposite sides of the fulcrum of the lever.

Manual over-riding means may be provided for over-riding control of the servo motor by the temperature responsive element.

Some embodiments of the invention will now be described by way of example, with reference to the accompanying drawings, in which:

FIG. 2 is a part-sectional elevation of a valve of the kind referred to,

Figure 1:
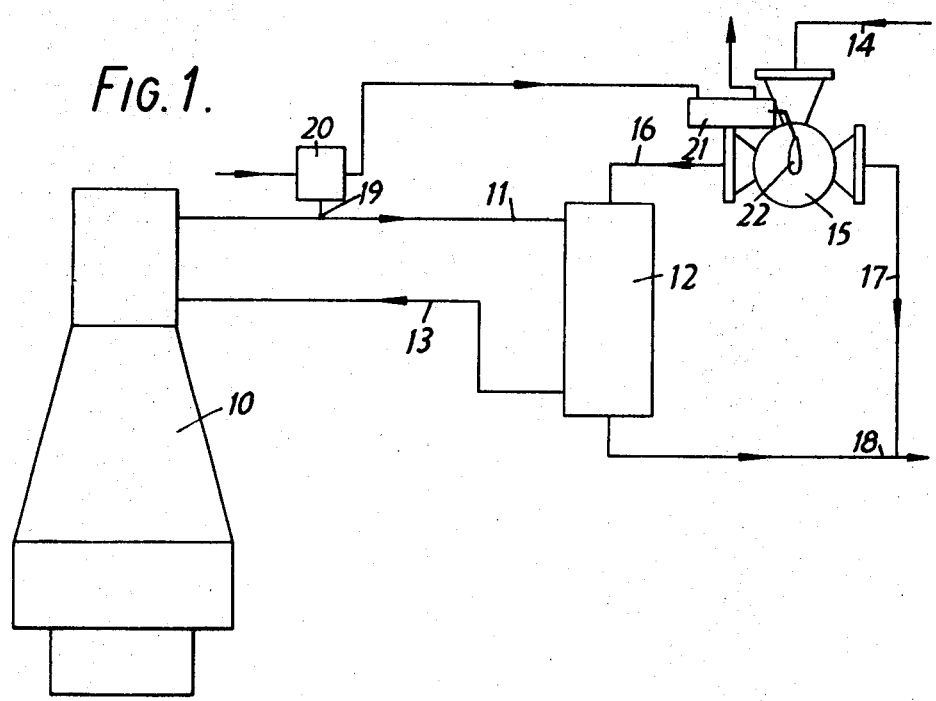
FIG. 1 shows diagrammatically the coolant circuit of a marine diesel engine.
Figure 8:
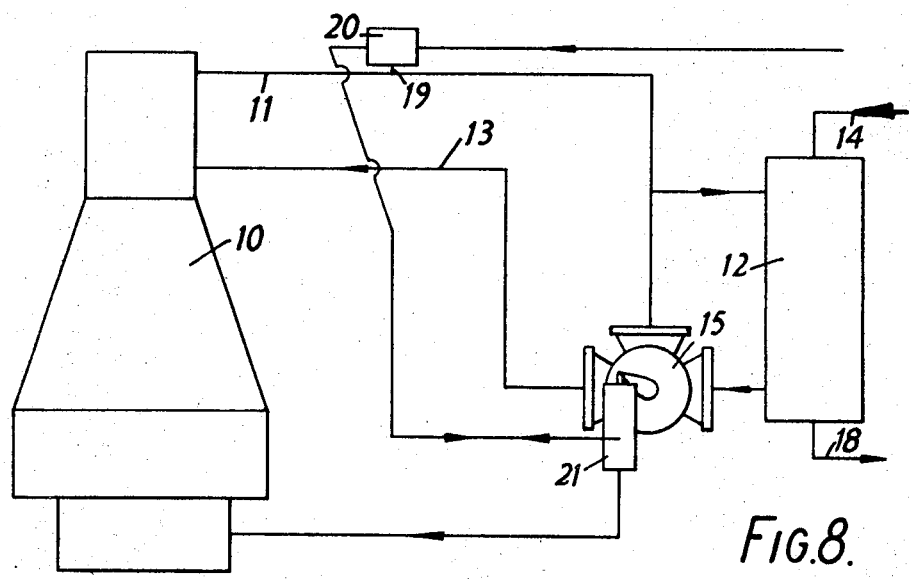
Figure 5:
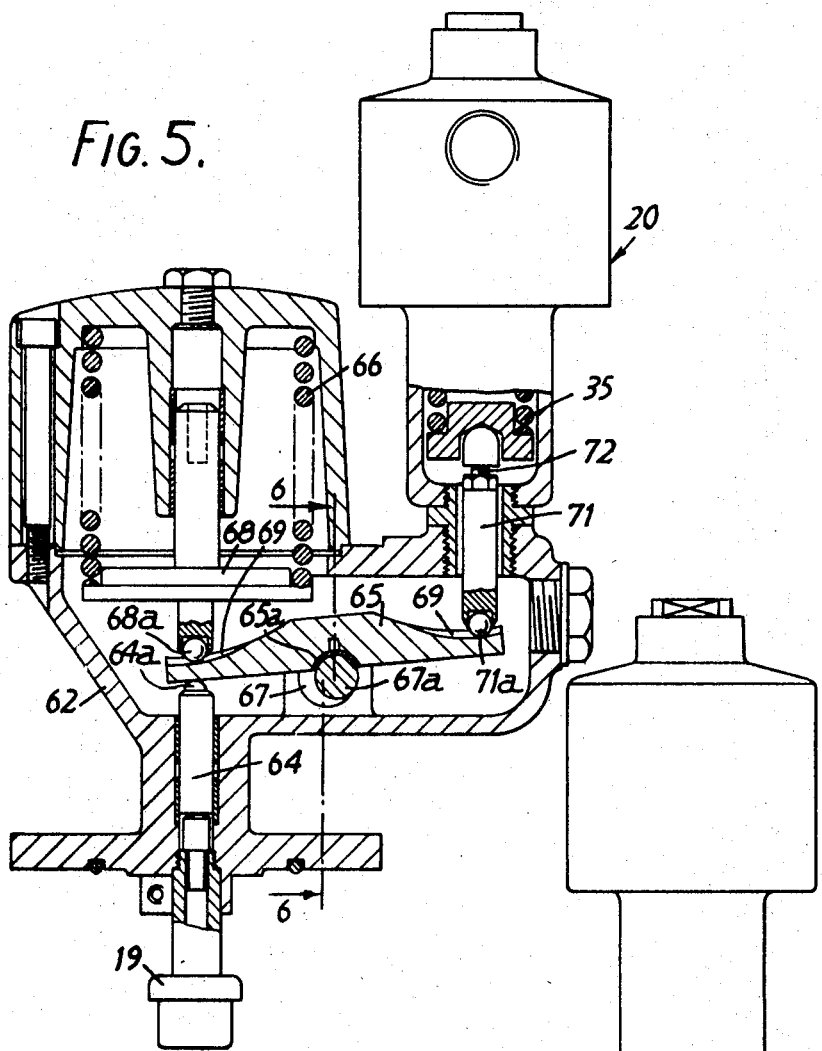
Figure 6:
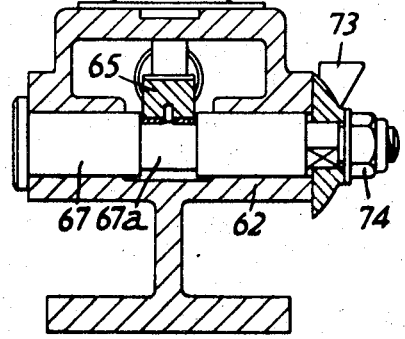
Figure 9:
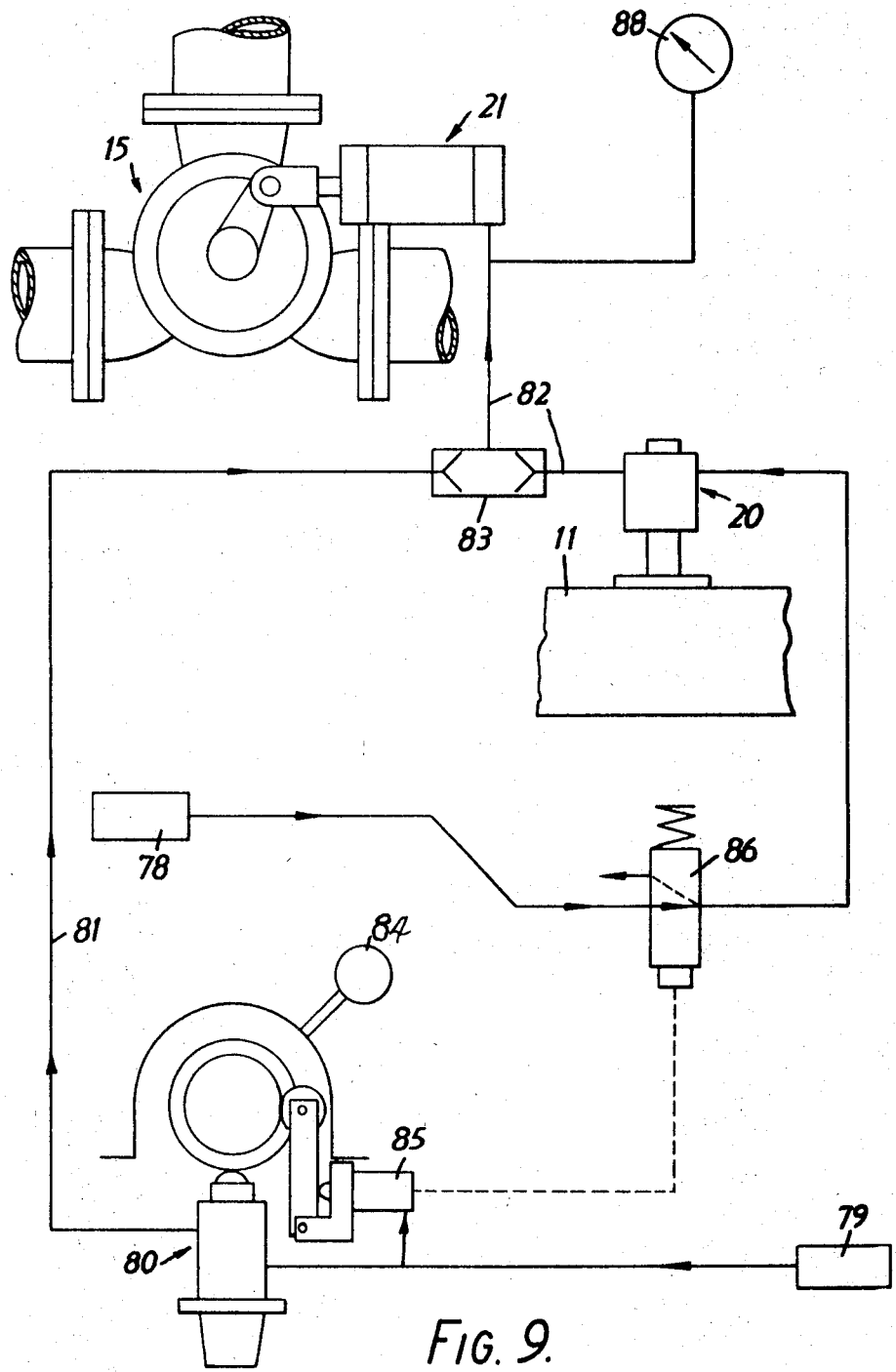
Figure 10:
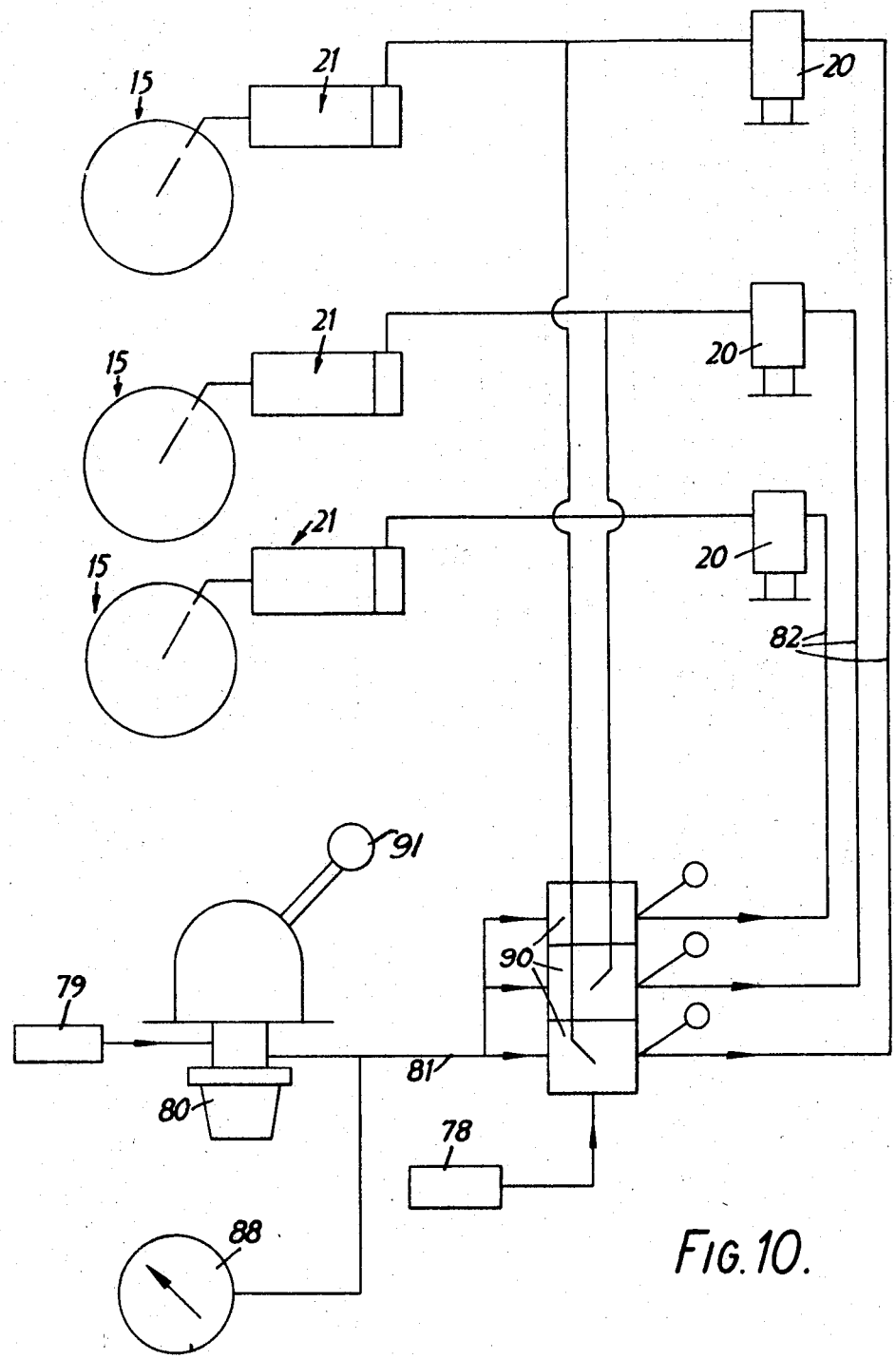

FIG. 4 shows a pressure controller in axial section and a temperature responsive element, FIG. 5 illustrates an alternative arrangement of the temperature responsive element and pressure controller, FIG. 6 is a fragmentary sectional view on line 6—6 of FIG. 5, FIG. 7 illustrates a modification of the arrangement of FIG. 5, FIG. 8 shows an alternative form of coolant circuit for a marine diesel engine to that shown in FIG. 1, FIG. 9 shows a manual over-riding ararngement, and FIG. 10 shows another form of manual over-riding arrangement.

Referring first to FIG. 1 of the drawings, cooling water for a marine diesel engine 10 flows from the engine along a conduit 11, through a cooler 12 and then back to the engine along a conduit 13. Sea water is used as the cooling medium which passes in heat exchange relationship with the engine coolant in the cooler 12. The sea water is conveyed to the cooler through an inlet conduit 14, a valve 15 and a conduit 16. The valve 15 operates to cause part of the sea water flowing along conduit 14 to flow along a conduit 17 which by-passes the cooler 12 to rejoin the sea water which has passed through the cooler 12 in an outlet conduit 18. Adjustment of the valve 15 varies the quantities of water flowing through the cooler 12 and by-pass conduit 17 in relation to each other and is governed by a temperature responsive element 19 which projects into the coolant conduit 11 near the engine. The element 19 controls the operation of a pressure controller or servo valve 20 from which servo fluid at a pressure controlled by the element 19 flows to a single-acting servo motor 21 mounted on the casing of the valve 15. The piston of the motor 21 is pivotally connected to a crank arm 22 secured on the rotor shaft of valve 15. Thus if the element 19 detects an increase in the temperature of the cooling water leaving the engine 10, the element causes the rotor of the valve 15 to be adjusted to increase the quantity of sea water flowing through the cooler 12 and to decrease the amount of sea water flowing through the by-pass 17. If the element detects a fall in the temperature of the coolant, the valve 15 is operated to reduce the amount of sea water flowing through the cooler 12 to increase the amount of sea water flowing through the by-pass 17.

The servo fluid may be derived from any convenient source, such as the engine lubricating oil system, a header tank, the level in which is automatically maintained, an independent electrically driven hydraulic pump circuit or the ship's compressed air supply.

In these arrangements the temperature sensitive element is of the kind in which a piston rod is forced outwardly against the resistance of a return spring by the expansion of wax, held in an enclosed chamber, on a rise of temperature. The wax in such elements is usually mixed with finely divided metal, such as copper powder, to improve its temperature responses. One example of a temperature sensitive element of this type is shown in British patent specification No. 576,779.

Referring now to FIG. 4, the temperature sensitive element 19 is screwed into a yoke 26 which is bolted to a flange on the conduit 11. Yoke 26 supports the pressure controller 20 which is operated by the piston rod 19a of the element 19 through a push rod 27, the length of which is adjustable for zeroing purposes. The pressure controller is of the diaphragm type incorporating a diaphragm 28 to which a valve element 29 is coupled by means of a rod 30 and which is subjected to the servo fluid pressure in the outlet passage 31 of the valve through a connecting port 32. The valve element 29 co-operates with an insert 33 affording a valve orifice. Servo fluid from a source which is not shown enters the pressure controller through an inlet passage 34 and flows thence through the orifice under the control of the valve element 29 and out through the outlet passage 31. The piston rod 19a of the element 19 exerts a pressure on the underside of the diaphragm 28 through push rod 27 and a compression spring 35 and operates so that an increase in the temperature of the engine coolant in the conduit 11 causes the diaphragm and valve element 29 to be urged upwardly to increase the pressure of the servo fluid supplied to the actuator 21.

Figure 2:
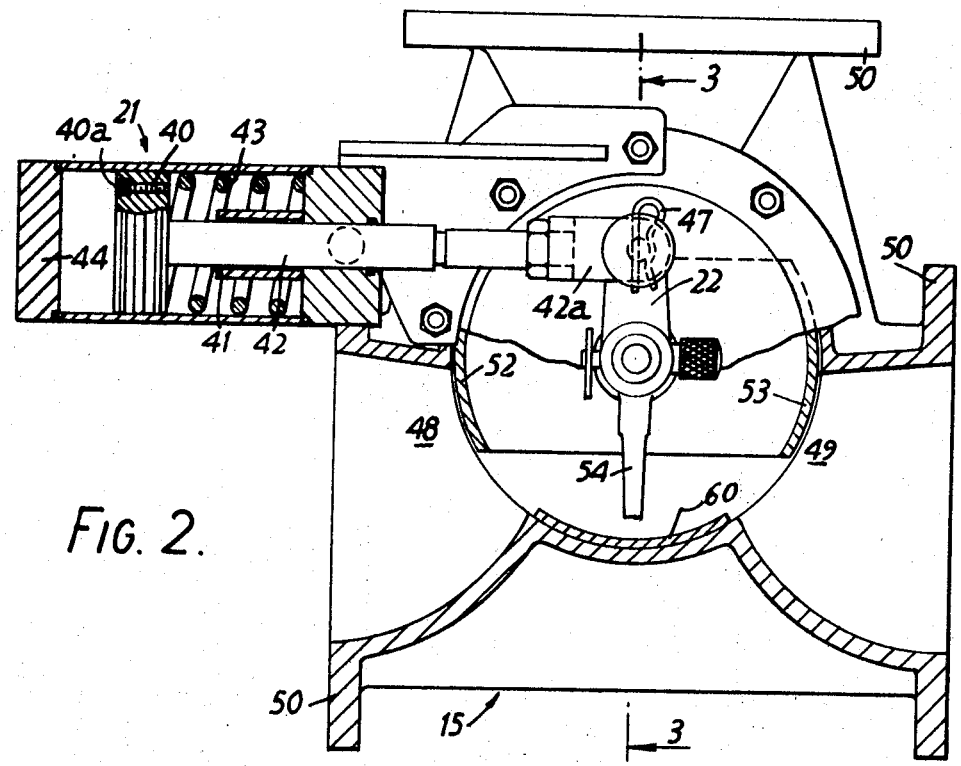
Figure 3:
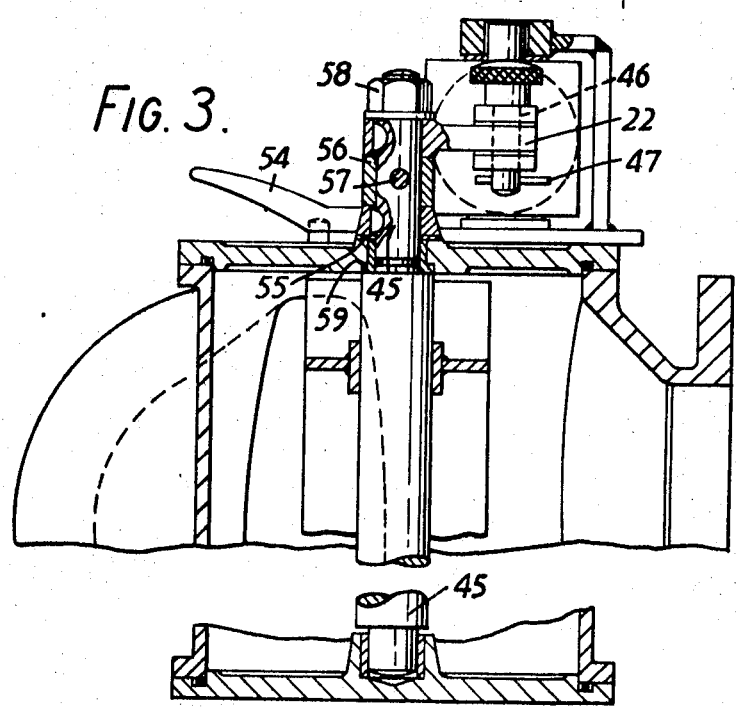
FIG. 3 is a sectional end view on the line 3—3 of FIG. 2.

Referring now to FIGS. 2 and 3 the servo motor 21 is of single-acting spring-return type and is carried in trunnion mountings on the body of valve 15. The servo fluid acts against the crown of the piston, and controlled leakage of the servo fluid past the piston is permitted by a metering orifice 40a in a passage 40 extending through the piston. A drain passage (not shown) opening to the cylinder at the rearward side of the piston returns this leakage fluid to a sump in the case where hydraulic servo fluid is used or exhausts to atmosphere if pneumatic operation is used. Movement of the piston by the servo fluid is limited by a distance sleeve 41 encircling the piston rod 42. Movement of the piston in the opposite direction by the return spring 43 is limited by the cylinder head 44.

A fork end 42a secured on the piston rod 42 embraces the crank arm 22 which is keyed to the rotor spindle 45 of the valve, and is coupled to the crank arm by a pin 46 which is retained in position by a clip 47. The body of the valve 15 provides a central cylindrical chamber coaxial with the rotor spindle 45, and three ports equally spaced apart around the axis of the chamber open to the chamber. Of these three ports, port 48 communicates with the cooler conduit 16 and port 49 communicates with the by-pass conduit 17. The third port (not shown) leads sea water from the conduit 14 into the cylindrical valve chamber. The valve body has coupling flanges 50 to enable it to be connected to conduits 14, 16 and 17. This valve rotor carries two arcuate masking elements 52, 53 which respectively co-operate with ports 48, 49. The rotor rotates within the valve chamber causing the two masking pieces to move across the ports 48, 49, and the arrangement is such that the sum of the effective areas of the ports 48, 49 is constant at a value such that the valve imposes no restriction or substantially no restriction on the flow of sea water through conduit 14. The valve rotor is secured to the spindle 45 and the spindle is carried in bearings in the valve body. A manually operable lever 54 is keyed to the valve spindle 45 and an anti-friction bearing 55 is disposed between the boss of the lever 54 and the valve body. Between the bosses of the lever 54 and the crank arm 22 a spacing sleeve 56 is secured by a pin 57 to the valve spindle.

If any failure of the automatic regulation system occurs, pin 46 can be removed to disconnect the crank arm 22 from the piston rod 42 to enable the valve rotor to be adjusted manually by means of lever 54. Further, if desired, pin 57 may be removed and a nut 58 engaged on the end valve spindle may then be tightened to jam the valve spindle, and hence the valve rotor, in any desired position of adjustment by clamping a shoulder 59 on the valve spindle against the valve body.

A stop 60 within the valve chamber limits the movement of the valve rotor in each direction and prevents the inlet port from being closed off by either of the masking pieces 52, 53.

Referring now to FIG. 5, an alternative arrangement is shown in which an increase in the temperature in the coolant conduit produces a reduction in the servo pressure applied in the servo motor 21. In this arrangement, the temperature sensitive element 19 is screwed into a housing 62 which is secured to a flange (not shown) on the conduit carrying the fluid of which the temperature is to be controlled. The temperature sensitive element 19 acts through a push rod 64 against the underside of a beam 65 in opposition to a spring 66. Spring 66 is disposed in a chamber in the housing and engages the beam through a platform member 68 and a ball bearing 68a. The beam has a segmented "dry" bearing 65a on its underside and is supported on an eccentric section 67a of shaft 67 which is carried in bearings in housing 62 and which rests in the bearing 65a. The pressure controller 20 is mounted on the housing 62 and is operated by a push rod 71 carrying an adjusting screw 72 for zeroing purposes. Push rod 71 engages the beam through a ball bearing 71a. Ball bearings 68a and 71a engage in respective lengthwise extending grooves 69 in the beam to minimise frictional effects and to provide transverse location for the beam, longitudinal location being provided by the eccentric section 67a and bearing 65a. The load and rate of the loading spring 66 is determined such that the temperature sensitive element is always under a known positive load while not exceeding the maximum permissible loading thereon.

In operation of this device an increase in the coolant temperature detected by the temperature sensitive element 19 causes the push rod 64 to move upward and push rod 71 to move downward to reduce the pressure of the servo fluid flowing to the servo motor 21. In use of this arrangement, the connections of ports 48 and 49 are changed about so that port 48 is connected to the by-pass passage and port 49 is connected to the cooler. This arrangement has the advantage of providing a "fail-safe" response if the temperature-sensitive element becomes defective and if the supply of servo fluid fails for any reason, maximum cooling being applied to the engine coolant. The arrangement also lends itself more readily to adjustment as described below.

Referring now to FIG. 6, one end of shaft 67 projects from the housing 62 and has fixed on it a manual adjusting lever 73 for rotating shaft 67, and a nut 74 for locking the shaft in selected positions. Such adjustment of the position of lever 73 raises and lowers the beam 65 to enable the relationship between the positions of the output member 19a of the temperature sensitive element 19 and the valve element 29 to be adjusted. The degree of adjustment is limited by the relative travels of the member 19a over the full temperature range of the element 19 and the compression of spring 35 required to produce a full range of movement of the rotor of valve 15. The concomitant shift of the fulcrum lengthwise of beam 65 has a negligible effect on the operation of the pressure controller.

In the modified arrangement illustrated in FIG. 7, a diaphragm 80 which closes a sealed air chamber 81 above the diaphragm engages the beam opposite the push rod 64 instead of spring 66. The air above the diaphragm is at a predetermined pressure and is introduced into the chamber through a non-return valve 82. Alternatively air may be supplied into the chamber through a miniature reducing valve from an existing compressed air system. Such arrangements have the advantage that the air loading on the diaphragm has a negligible rate so that the maximum loading on the output member 19a of the element 19 can be less than when a spring of finite rate is used as in the arrangement of FIG. 5.

As a further alternative a dead-weight may replace spring 66 in FIG. 5.

In the arrangements of FIGS. 5, 6 and 7 the balls 68a and 71a and a ball 64a carried by push rod 64 are hardened steel balls and act on hardened seats, and "dry" bearings are employed for the push rods 64, 71 and the bearing rod of platform member 68 to minimise friction and hysteresis.

Adjustment of the arrangements of FIGS. 5 to 7 is made first by means of the adjustable length push rod 71, and then by means of the lever 73 to raise or lower the fulcrum of beam 65 so as in effect to rotate the beams about the plunger thereby making an adjustment between the position of the plunger 19a of the temperature responsive element 19 and of the pressure controller diaphragm spring 35, so that for a particular temperature and element position the controller signal pressure will change giving a new relationship between fluid temperature and the position of the rotor in the three-way valve 15, and thus a new "set point." The degree of adjustment is limited by the relative travels of the temperature responsive element over its full temperature range and the compression required on the controller diaphragm spring to give full travel of the rotor of the three-way valve. Operation of the controller is not limited to use with one element 19 only. If two elements of differing temperature ranges are used in tandem, a signal from the controller can be obtained over a wider range of temperatures, giving more latitude in the selection of the "set point" temperature.

If desired, the arrangements shown in FIGS. 5 to 7 may be further modified to enable adjustment of the change in temperature required to bring about a full range of travel of the rotor of valve 15. Provision for such adjustment may be made either by providing alternative fixed positions for shaft 67 lengthwise of beam 65 or by an arrangement enabling the position of the shaft 67 to be readily adjusted lengthwise of the beam. A similar adjustment may be made by replacing either the diaphragm spring 35 and/or the actuator return spring 43 by a spring having a different rate.

Referring to FIG. 8 of the drawings, an arrangement for cooling the coolant of a marine diesel engine is shown which employs a valve similar to the valve 15 but having a slightly different disposition of the outlet ports 48 and 49 and the inlet port. The components corresponding to those in FIG. 1 carry the same reference numerals. In the arrangement of FIG. 8, the valve 15 is disposed in the engine coolant circuit and divides the flow of coolant, part of the coolant being diverted by the valve through the cooler 12 and the other part of the coolant flowing straight through the valve so as to by-pass the cooler, the two parts of the flow being recombined in the valve and returned to the engine. A steady flow of sea water is maintained through the cooler to carry away the excess heat in the coolant. In this arrangement, the servo fluid is air tapped from an existing compressed air system and the leakage servo fluid from the motor 21 is exhausted to atmosphere. As in the arrangement of FIG. 1, the temperature sensitive element 19 acts on the pressure controller 20 to vary the pressure of servo fluid supplied to the motor to actuate the valve to proportion the flow of coolant through the cooler and the by-pass so as to maintain the coolant in conduit 11 at substantially a constant predetermined temperature.

Arrangements similar to FIG. 5, in which an increase in the temperature sensed produces a reduction in the pressure of the servo fluid supplied to the servo motor, have further advantages when applied in marine engine coolant control arrangements. For example, when the engine coolant temperature sensed by element 19 falls, servo fluid at maximum pressure is supplied to the servo motor so that full power is applied by the servo motor in closing off the operation of the cooler. This is particularly useful because the shutting down of the cooler is a critical part of the valve's function. A very considerable amount of heat is taken out of the coolant by the cooler when the engine is in operation, and if the shutting down of the cooler is not prompt and certain when the engine is shut down, the coolant becomes cold and substantial damage to the engine may occur owing to the resulting thermal shocks to components of the engine. Also, when the whole engine and cooling system is stopped, the valve 15 is operated by the spring of motor 21 into its position directing the full flow of coolant through the cooler (see FIG. 8).

By admitting the servo air to the system before the engine is started, full servo pressure is applied in the servo motor which therefore moves the valve member into its position in which it closes off the flow to the cooler. During this first movement of the valve therefore, the power available to overcome friction and any sticking which there may be of the motor and valve 15 components is a maximum; thus there is the best chance of immediate elimination of faulty operation owing to the effects of friction and sticking after a long period of shut-down.

The modern practice of operating machinery is to group all the control functions into a central control room and to have the minimum number (in some cases one man only) on duty in the control room to supervise the running of the machinery, of which all the main functions are carried out automatically. It is therefore desirable that any malfunction of the automatic equipment should be capable of being dealt with in the control room without the engineer having to enter the main machinery compartment to deal with the malfunctioning at the local point which may be a considerable distance from the control room.

A means of obtaining remote manual operation of the type of three-way valve described above is shown diagrammatically in FIG. 9. A manually operated pressure regulating valve 80 is mounted in the control room and the output line 81 thereof is connected to the valve actuator pressure line 82 through a double non-return valve 83. Valve 80 has a different source 79 of servo air to that (78) of regulator 20. Initial movement of the controller lever 84 is arranged to operate a valve 85 sending a signal to a pilot operated three-way valve 86 which cuts off the pressure servo air supply to the automatic temperature sensitive pressure regulator 20. Further movement of the manual controller lever 84 varies the pressure of the servo air in line 81 which leads via the double non-return valve to the spring return valve actuator 21, so that it is possible to position the three-way valve as desired by varying the manually controlled signal pressure. A pressure gauge 88 mounted at the control position can be calibrated to indicate the degree of opening of the three-way valve 21. The design of the manual controller is such that the lever can be left locked in any desired position.

In most installations a number of automatic three-way valves will be fitted and it is possible to arrange for any one to be manually controlled from the control position by a single manual controller. FIG. 10 shows such an arrangement which incorporates a bank of four-way manually operated valves 90 operable to select for manual control by a manual controller 91 any one of a number of three-way valves 15 by connecting the servo air pressure line 82 of that valve 15 to the manually controlled air pressure line 81, instead of to the source 78 through controller 20.

The advantages of arranging for manual operation of the three-way valves from a remote position also include increased reliability in that the pressure supply for the automatic operation of the valve and for the manual operation can be arranged from separate sources as in FIGS. 9 and 10, so that in the event of failure of "automatic" air supply the valve can be operated manually from the alternative supply.

I claim:

1. A temperature responsive control valve arrangement for controlling the temperature of a primary liquid flowing in a conduit, comprising an element responsive to the temperature of the liquid in the conduit, a heat exchanger through which at least part of the flow of primary liquid and at least part of a flow of a secondary liquid flow in heat exchange relationship, a by-pass valve controlling the flow of one of said liquids through the heat exchanger for regulating the proportions in which the primary liquid and the secondary liquid flow through the heat exchanger by dividing the flow therethrough between the heat exchanger and a by-pass passage, the valve being adapted so that the total flow area provided thereby for the flows through the heat exchanger and the by-pass passage is constant for all positions of the valve, a source of pressure servo fluid and a single acting piston type servo motor connected to the valve and operated by the servo fluid against the restraint of a spring operating on the piston, and a pressure controller controlling, in dependence on the temperature responsive element, the pressure of the servo fluid which is supplied to the servo motor in a sense to maintain the temperature of said liquid constant, said pressure controller having a diaphragm, a spring loading the diaphragm, the temperature responsive element being connected to vary the loading of said spring in dependence on the temperature sensed by the element and a servo valve through which the servo fluid supplied to the servo motor passes and which is connected to be operated by movement of the diaphragm to continuously control the valve opening, the pressure of the servo fluid at the down stream side of the servo valve acting on the diaphragm in opposition to the spring.

2. An arrangement as claimed in claim 1, wherein the temperature responsive element comprises a plunger and cylinder, whereof the cylinder is filled with wax and is exposed to the flow of said primary liquid.

3. An arrangement as claimed in claim 1, wherein the secondary liquid is a coolant and wherein the temperature responsive element controls the pressure of the servo fluid applied to the piston of the servo motor to be at a maximum when the flow through the heat exchanger determined by the valve is a minimum.

4. An arrangement as claimed in claim 1, wherein manual over-riding means is provided for over-riding control of the servo motor by the temperature responsive element.

5. An arrangement as claimed in claim 4, wherein the manual over-riding means comprises a second source of servo fluid under pressure, which source is independent of that of the servo fluid whereof the pressure is controlled by the temperature responsive element, manual means for controlling the pressure of the servo fluid from said second source, and a changeover valve operable to supply servo fluid from either one of said sources to the servo motor and to cut off the supply of servo fluid from the other of the sources to the servo motor.

6. A plurality of valve arrangements each as claimed in claim 1, wherein manual over-riding means is provided which is selectively operable to over-ride control of the servo motor in any one of the valve arrangements by the temperature responsive element associated with that servo motor.

7. An arrangement as claimed in claim 1 wherein the temperature responsive element controls the pressure of the servo fluid applied to the piston of the servo motor to be at a maximum when the flow through the heat exchanger determined by the valve is a minimum, wherein the movement of the plunger is transmitted to a servo valve by a beam, the plunger and the servo valve being connected to the beam at opposite sides of the fulcrum of the lever.

8. An arrangement as claimed in claim 7, wherein resilient means is provided acting on the beam in opposition to the plunger at the same side of the fulcrum as the plunger.

9. An arrangement as claimed in claim 8, wherein the resilient means is afforded by a volume of air trapped in a chamber, one wall of which is provided by a diaphragm, said diaphragm having a central boss which engages the beam.

10. An arrangement as claimed in claim 7, wherein the fulcrum is adjustable to rotate the beam, in the plane of the normal movement of the beam, about the end of the beam which is engaged by the plunger.

11. An arrangement as claimed in claim 5, wherein the fulcrum is provided by an eccentric portion of a shaft extending transversely of the beam, means being provided for rotating the shaft to adjust the position of the fulcrum.

References Cited

UNITED STATES PATENTS

| | | | |
|---|---|---|---|
| 1,335,391 | 3/1920 | Rayfield | 123—178 |
| 1,418,397 | 6/1922 | Rayfield | 236—34.5 |
| 1,490,971 | 4/1924 | Giesler | 236—34.5 |
| 2,439,336 | 4/1948 | Dillman | 236—100X |
| 2,457,618 | 12/1948 | Wiesendanger | 236—34.5 |
| 3,160,346 | 12/1964 | Kimm | 236—34.5X |

EDWARD J. MICHAEL, Primary Examiner

U.S. Cl. X.R.

236—86